(12) United States Patent
Whittaker et al.

(10) Patent No.: US 6,728,493 B1
(45) Date of Patent: Apr. 27, 2004

(54) METHOD AND ARRANGEMENT FOR CLOCK AND DATA RECOVERY

(75) Inventors: Edward Whittaker, Bishops Stortford (GB); Darrell Smith, Bishops Stortford (GB); Paul Wilson, Hertford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/537,359

(22) Filed: Mar. 29, 2000

(51) Int. Cl.$^7$ ............................................. H04B 10/06
(52) U.S. Cl. ........................ 398/155; 398/154; 398/209
(58) Field of Search ..................... 359/189; 455/180.3; 398/209, 155, 154, 210, 9; 370/476, 506, 516; 340/552; 375/345

(56) References Cited

U.S. PATENT DOCUMENTS

| | | | | |
|---|---|---|---|---|
| 4,019,048 A | * | 4/1977 | Maione et al. .............. 359/176 |
| 4,605,922 A | * | 8/1986 | Blattman et al. ........... 340/552 |
| 5,390,180 A | * | 2/1995 | Reilly ........................ 370/476 |
| 6,243,183 B1 | * | 6/2001 | Enfors et al. ............... 359/189 |
| 6,498,670 B2 | * | 12/2002 | Yamashita et al. .......... 359/189 |

* cited by examiner

Primary Examiner—Leslie Pascal
Assistant Examiner—David Payne
(74) Attorney, Agent, or Firm—Barnes & Thornburg

(57) ABSTRACT

An optical receiver arrangement comprises a phase locked loop incorporating a voltage controlled oscillator whereby the loop can be matched in frequency to a received signal frequency. A frequency detector associated with the loop produces an output comprising first or second pulses indicative of whether the loop frequency is above or below the received signal frequency. A control circuit determines a time averaged measure of difference between the loop frequency and the received signal frequency, and issues a loss of lock alarm if this averaged difference exceeds a predetermined value.

18 Claims, 7 Drawing Sheets

METHOD AND ARRANGEMENT FOR CLOCK AND DATA RECOVERY

FIELD OF THE INVENTION

This invention relates to clock and data recovery from a received digital signal in a communications network. The invention further relates to arrangements and methods for determining loss of lock between a receiver and an input signal in an optical communications network.

BACKGROUND OF THE INVENTION

Digital transmission is widely used for the transport of voice and data signals. In a typical system, the signals from various sources are digitally encoded and are then subjected to one or more levels of multiplexing for transmission over the network. In general, such signals will be transmitted using the SDH (synchronous digital hierarchy) or SONET protocol in which the network is synchronised to a master clock and in which the transmitted signal carries timing information whereby system nodes can synchronise to the master clock. Typically, the higher levels of multiplexing are transmitted in the form of optical signals over fibre paths that provide links between nodes in the network. At the network nodes, received optical signals are converted to corresponding electrical signals for processing, e.g. to effect switching and/or to add/drop channels. In order to perform such operations at a node, it is of course essential to determine the timing or bit rate of the received optical signal so as to affect clock and date recovery and synchronise the node with the signal. This is generally referred to as clock and data extraction. For high bit rate systems, such a function is generally performed by a phase locked loop (PLL) arrangement which synchronises with the received signal clock rate. This then provides a timing reference for the node so as to permit the necessary de-multiplexing of the received signal for the purpose of switching and/or the dropping of channels at the node. A particular problem with currently used phased lock loop circuits is their limited ability to accommodate noisy data. Under noise conditions, such circuits can lose lock with the signal. This causes the generation of a loss of lock alarm and the discarding of the received data signal.

The purpose of loss of lock detection is to discard the data and run the node at a locally generated temporary clock in the event that the received data is in some way faulty and no longer suitable as a timing reference source. In currently used phase locked loop systems, the presence of noise can cause a false alarm of loss of lock resulting in data and timing reference loss even though there may be no fault in the data itself.

SUMMARY OF THE INVENTION

An object of the invention is to minimise or to overcome the above disadvantages.

A further object of the invention is to provide an improved arrangement and method for determining loss of lock between an input signal and a receiver in an optical transmission system.

According to a first aspect of the invention, there is provided an optical receiver arrangement comprising: a phase locked loop incorporating an oscillator whereby the loop can be matched in frequency to a received signal frequency, a frequency detector arranged to produce an output indicative of whether the instant loop frequency is above or below said received signal frequency, and control means responsive to said frequency detector output for generating a loss of lock indication when a time averaged measure of difference between the loop frequency and the received signal frequency exceeds a predetermined value.

According to another aspect of the invention, there is provided a network node for use in an optical transmission system in which traffic is transported in multiplexed digital form, the node incorporating optical receiver arrangement comprising: a phase locked loop incorporating an oscillator whereby the loop can be matched in frequency to a received signal frequency, a frequency detector arranged to produce an output indicative of whether the instant loop frequency is above or below said received signal frequency, control means responsive to said frequency detector output for generating a loss of lock indication when a time averaged measure of difference between the loop frequency and the received signal frequency exceeds a predetermined value, and for enabling a local timing means for providing a timing reference to the node.

According to a further aspect of the invention, there is provided a method of detecting loss of lock between a received signal frequency and a local oscillator frequency in an optical receiver arrangement having a phase locked loop incorporating an oscillator whereby the loop can be matched in frequency to a received signal frequency, the method comprising: determining whether the instant loop frequency is above or below said received signal frequency, determining a time averaged measure of a difference between the loop frequency and the received signal frequency, and generating a loss of lock indication when said time averaged difference measure exceeds a predetermined value.

According to a further aspect of the invention, there is provided a circuit arrangement for extracting clock information from a received digital signal and for detecting loss of frequency lock with that signal, the circuit comprising a phase locked loop incorporating an oscillator whereby the loop can be matched in frequency to a received signal frequency, a frequency detector arranged to produce an output indicative of whether the instant loop frequency is above or below said received signal frequency, and control means responsive to said frequency detector output for generating a loss of lock indication when a time averaged measure of difference between the loop frequency and the received signal frequency exceeds a predetermined value.

According to another aspect of the invention, there is provided an arrangement for determining loss of frequency lock between a receiver local oscillator and a received digital optical signal in an optical communications system, the arrangement comprising: a frequency detector arranged to produce an output indicative of whether the instant oscillator frequency is above or below said received signal frequency, and control means responsive to said frequency detector output for generating a loss of lock indication when a time averaged measure of difference between the oscillator frequency and the received signal frequency exceeds a predetermined value.

By providing a time average of frequency slips between the phase locked loop and the received signal, the problem of spurious triggering of a loss of lock alarm by noise or minor glitches in the received signal is substantially overcome.

Advantageously, the frequency detector provides first and second pulse signals indicative of the number of cycle slips respectively above or below the nominal frequency between the phase locked loop and the received signal.

BRIEF DESCRIPTION OF THE DRAWINGS

A preferred embodiment of the invention and the best node of putting the invention into practice will now be described with reference to the accompanying drawings in which.

DESCRIPTION OF PREFERRED EMBODIMENT

Figure 1:
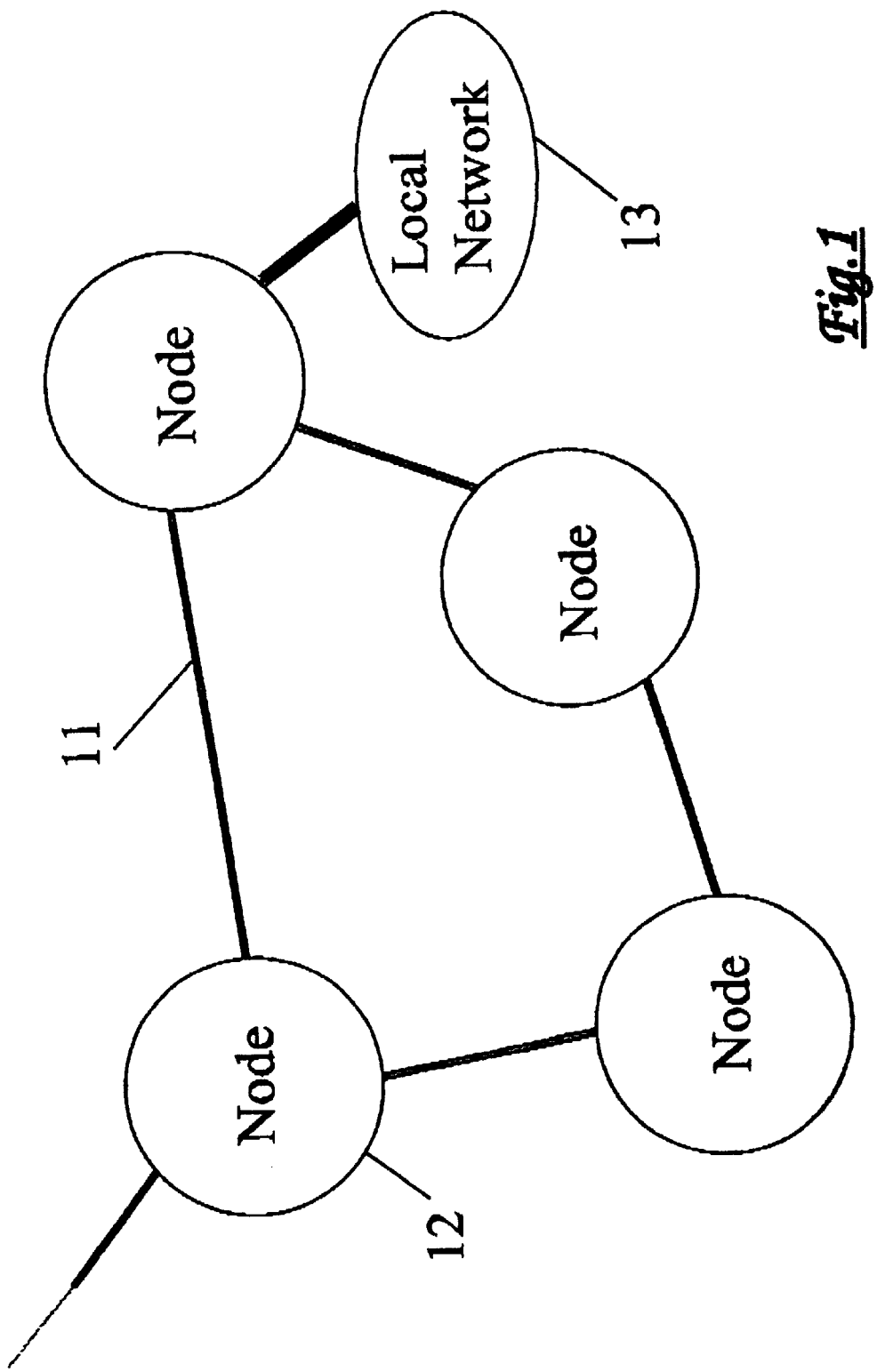
FIG. 1 is a schematic diagram of part of a optical communications system.

Referring first to FIG. 1, this depicts in schematic from part of an optical communications system in which multiplexed digital traffic is carried over optical fibre paths 11 between network nodes 12. It will be appreciated that the fibre paths 11 may include a number of fibres carrying traffic in forward and return directions. Further, a fibre may carry a single optical frequency or a number of frequencies providing wavelength division multiplexing. Typically, the network will be a synchronous network, e.g. an SDH or a SONET network, in which digitised traffic is carried in virtual containers within frames. Traffic arriving at a node is converted from optical signals into corresponding electrical signals which can then undergo processing such as de-multiplexing/multiplexing in order perform switching and/or adding/dropping of channels from/to local networks 13. In order to perform these functions, each node adjusts its timing by extracting a clock signal that is incorporated in the transmitted optical signal.

Figure 2:
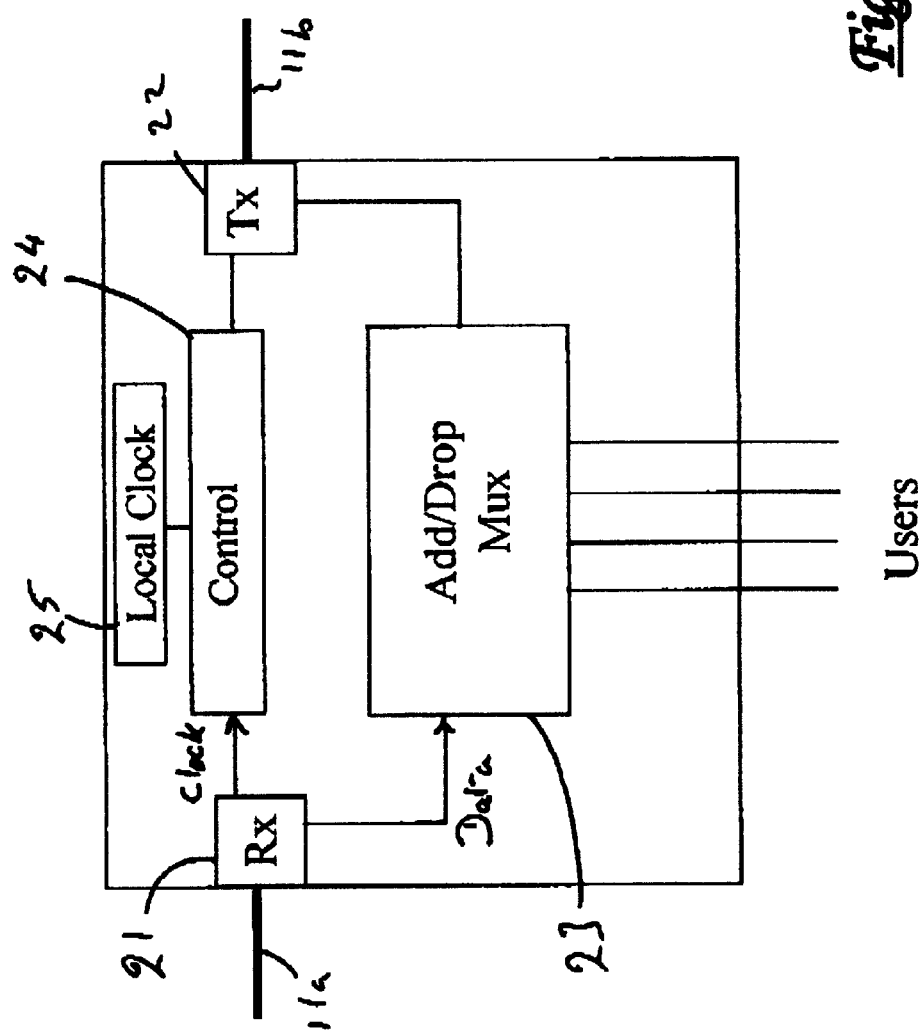
FIG. 2 illustrates the general construction of a node in the communications system of FIG. 1.

The general construction of one of the network nodes of FIG. 1 is shown schematically in FIG. 2. The node incorporates receivers 21, one for each incoming fibre 11a, and transmitters 22, one for each outgoing fibre 11b. For clarity, the figure shows only one transmitter and receiver, but it will of course be appreciated that a node may incorporate many of such devices. It will further be appreciated that duplication of fibre paths may be provided for protection purposes. The data output from the receiver 21 is fed to an ad/drop multiplexer 23 which further functions as a switch to provide appropriate routing of traffic channels. Timing information from the receiver, together with overhead information associated with the received traffic is fed to a control unit 24. The control unit is provided with a local standby clock 25 which is used as an emergency timing reference for the node in the event that the node cannot be synchronised to the network clock from a received signal.

Figure 3:
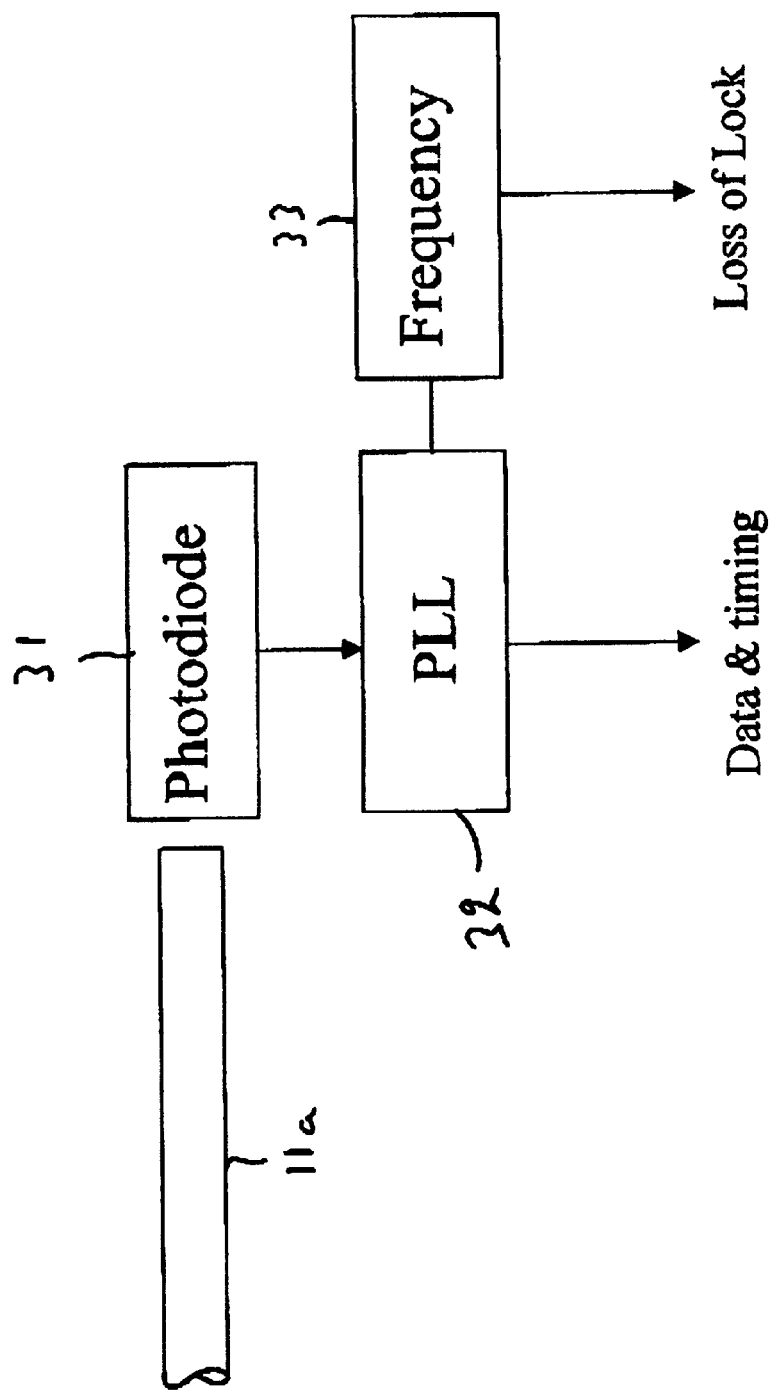
FIG. 3 shows in schematic from a receiver arrangement for use in the system of FIG. 1.

FIG. 3 shows an exemplary receiver arrangement disposed at a node for converting the incoming optical signal to a corresponding electrical signal and for deriving timing information from that electrical signal so that this signal can then be processed at the node. The receiver comprises a photodiode detector 31 optically coupled to the fibre 11a, the electrical output of the photodiode being fed to a phase locked loop (PLL) 32. The PLL 32 locks to the receiver signal both in frequency and phase so as to determine accurate clock for subsequent processing of the data signal by the node. A frequency detector circuit 33 is associated with the phase locked loop 32 and compares the frequency of the received signal with the current frequency of the phase locked loop. If these frequencies differ significantly, e.g. as a result of a frequency drift of the received signal, the frequency detector 33 issues a loss of lock indication to inform the node that the receiver clock is no longer suitable and that the node should switch to its temporary local clock for timing purposes. The frequency detector is also employed selectively in an acquisition mode, as will be discussed below, to adjust the loop frequency up or down to obtain lock with a received signal. Typically, when a loss of lock is detected, the phase locked loop is temporarily locked to the local clock.

Figure 4:
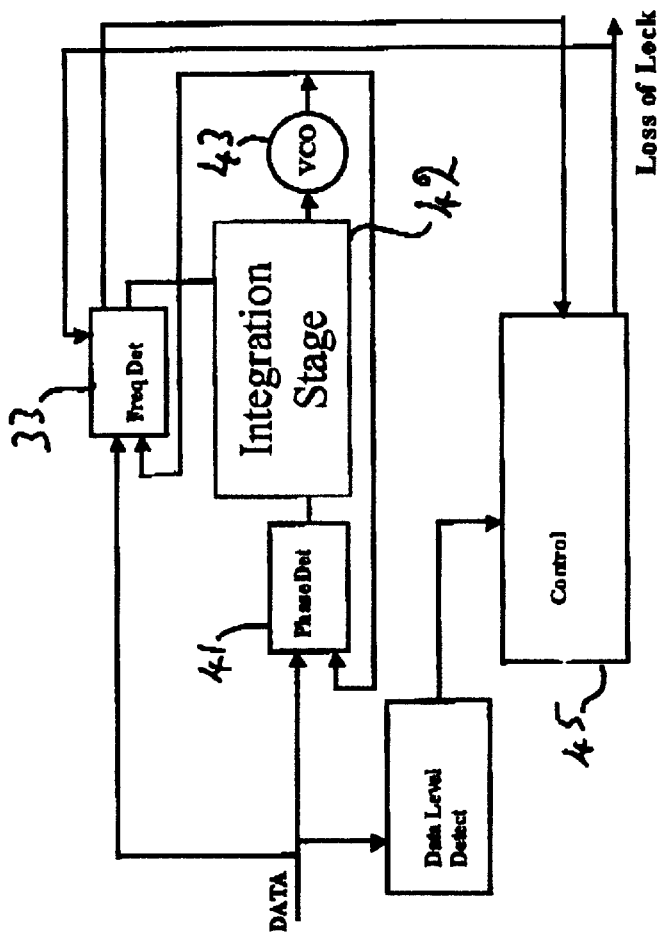
FIG. 4 shows a phase locked loop circuit according to a preferred embodiment of the invention.

FIG. 4 shows the PLL and frequency detector arrangement in further detail. Incoming data is fed to one input of a phase detector 41 and to one input of frequency detector or comparator 33. The output of the phase detector 41 is fed to integration stage 42, whose output provides a control voltage for a voltage controlled oscillator (VCO) 43. The output signal from the VCO 43 is fed back to the second input of the phase detector 41 thus completing the loop.

Figure 4A:
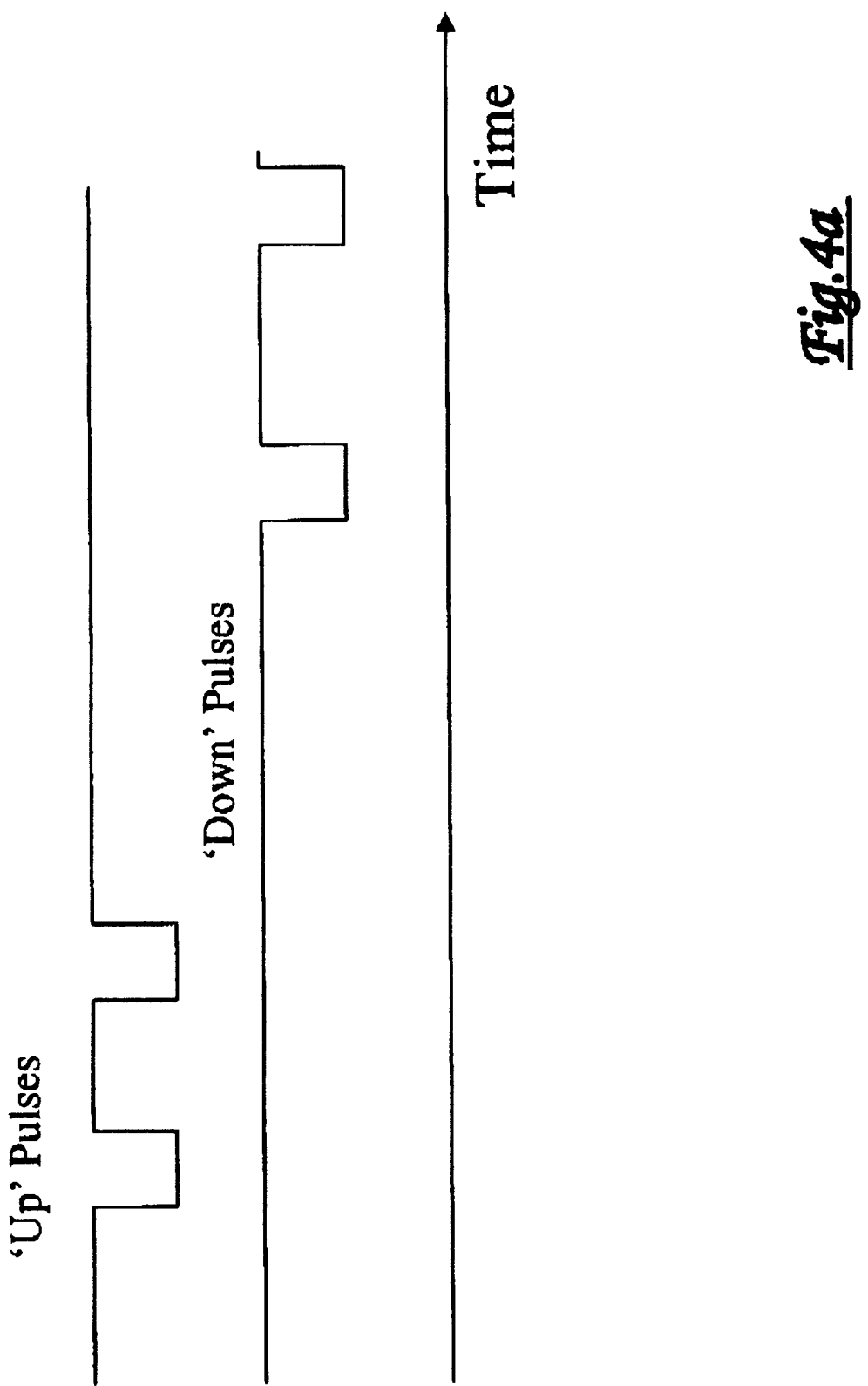
FIG. 4a illustrates output signals from a frequency detector or comparator in the circuit of FIG. 4.

The VCO output signal is also fed to the second input of the frequency detector 33 which compares the VCO frequency with that of the incoming data signal. The output of the frequency detector, which advantageously comprises a first or second series of pulses according to whether the VCO frequency is above or below the incoming signal frequency, is fed to the control circuit 45. These pulses are also referred to as 'up' pulses and 'down' pulses respectively, and typical pulse sequences are illustrated in FIG. 4a. In an acquisition mode, the output pulses indicative of a loop frequency above or below the signal frequency are fed to the integrator stage 42 whereby to provide a respective decrease or increase of the VCO frequency so as to obtain a match with the signal frequency and to lock the loop thereto.

Figure 5:
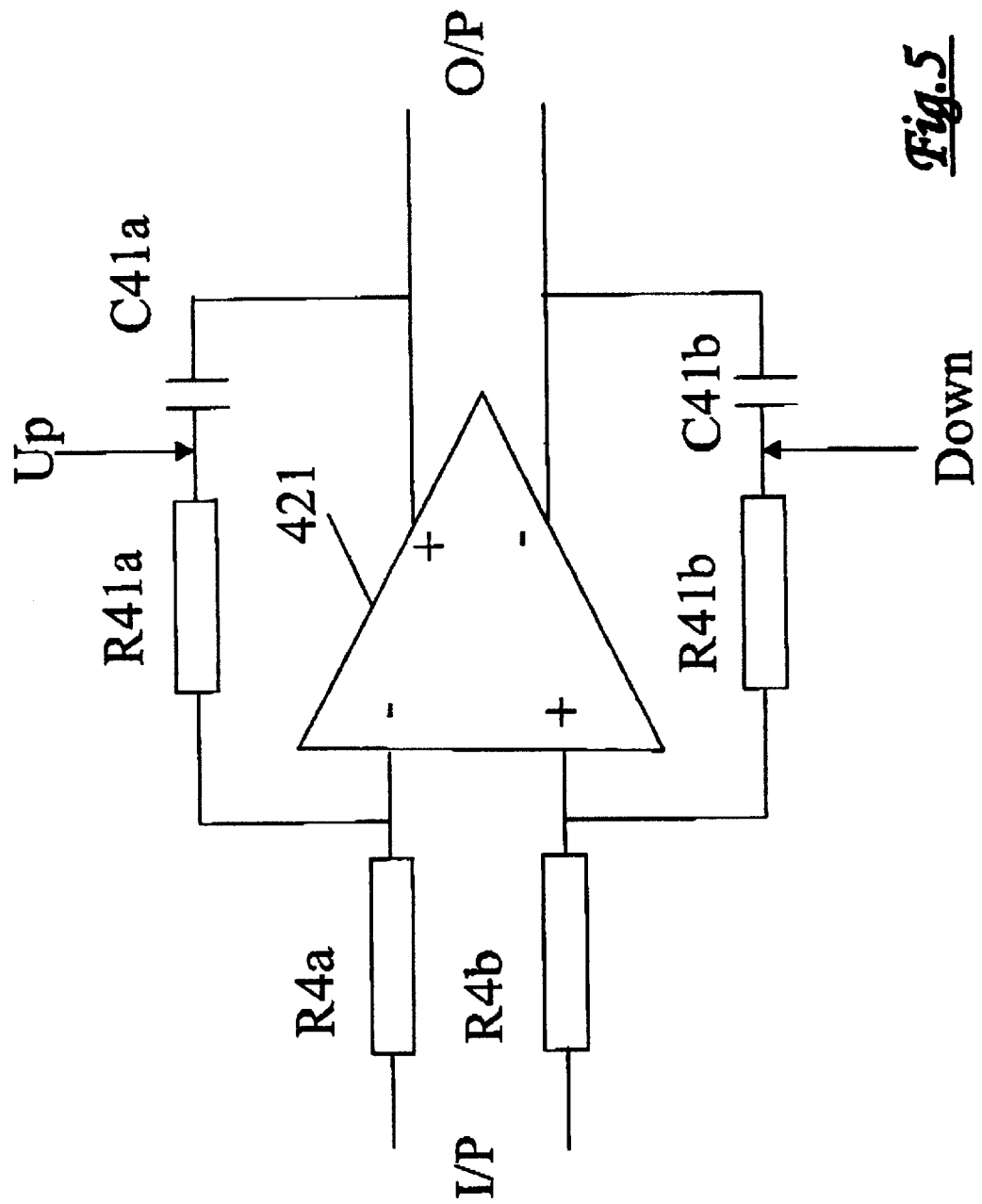
FIG. 5 shows an integration stage construction employed in the phase locked loop circuit of FIG. 4.

A suitable construction of the integration stage 42 is depicted in FIG. 5. The stage comprises a differential amplifier 421 having feedback paths each comprising a series connected resistor (R41a, R41b) and capacitor (C41a, C41b) arranged between the respective inputs and outputs. Input resistors R4a, R4b may be provided. In the acquisition mode, the pulse signals from the frequency detector representing a measure of any frequency mismatch of the loop above or below the signal frequency are fed to the respective feedback loops causing the amplifier to increase or decrease its output voltage accordingly and thereby provide an adjustment of the VCO frequency. When the VCO has been adjusted to the correct frequency so that the phase locked loop can lock to the signal frequency, the acquisition mode is terminated and the frequency detector ceases the transmission of pulses to the integrator stage. However, the two output pulse signals continue to be fed to the control circuit.

The control circuit 45 (FIG. 4) determines from the two sets of pulse signals received from the frequency detector whether any indicated loss of lock is of sufficient magnitude to require default action to be take by the node and, if so, issues a loss of lock signal to the node and to the frequency detector. In that event, the node ignores the received data and switches to its internal standby clock for nodal timing purposes.

In the embodiment of FIG. 4, a data level detector 46 is employed to determine whether the signal has fallen below a certain minimum amplitude at which detection becomes unreliable. This can occur for example as a result of a fault in the optical transmission system. This information is used to override the control circuit function and force a loss of lock indication to be flagged. This level detection function can alternatively be derived from an AGC amplifier chain (not shown) preceding the PLL. In this latter case, the level detector 45 may be omitted from the PLL and the amplitude signal instead be derived from the AGC.

Figure 6:
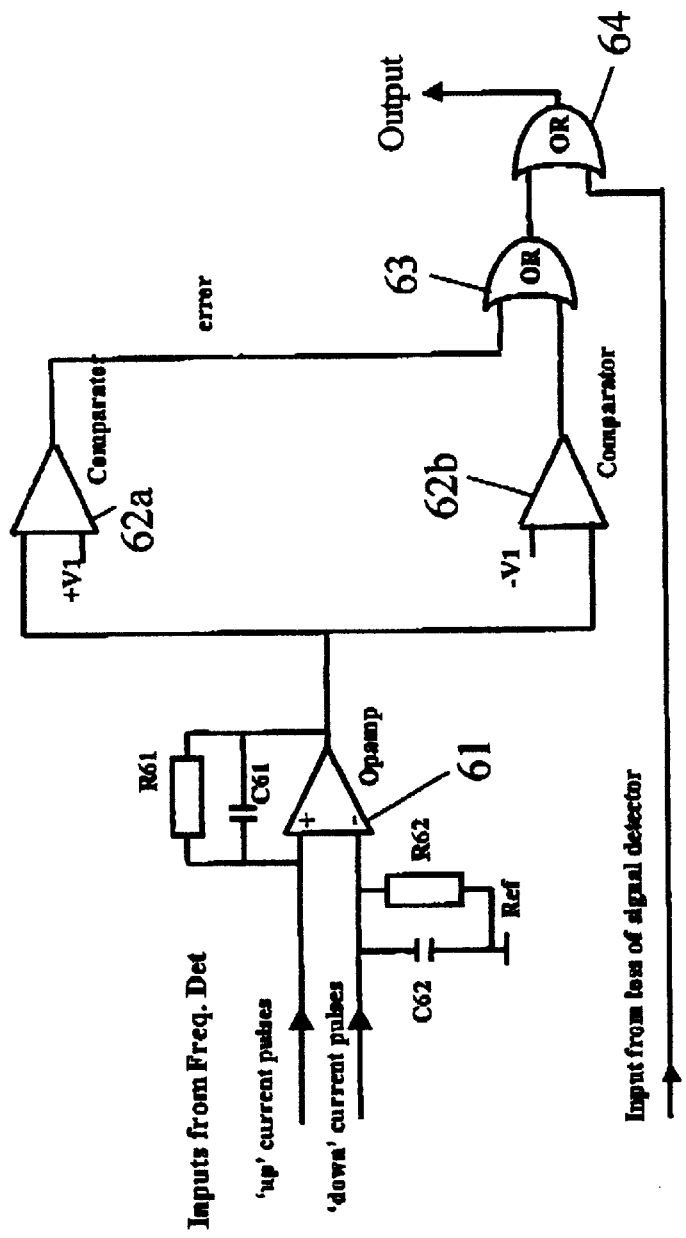
FIG. 6 shows a control circuit for use in the phase locked loop circuit of FIG. 4.

FIG. 6 shows the detailed construction of the control circuit employed in the phase locked loop circuit of FIG. 4. The frequency detector 33 produces a current pulse on one or other of its output lines every time the VCO clock slips up or down one cycle with respect to the incoming data/reference. The 'up' pulses and 'down' pulses received at the control circuit from the frequency detector are fed respectively to the first and second inputs of an operational amplifier 61. These pulses indicative respectively of a loop frequency slip above or below the signal frequency are each integrated by respective leaky integrators comprised by the feedback parallel network of R61 and C61, and by the parallel network of R62 and C62. This frequency slip will normally result from a drift of the received signal from its nominal frequency rather than a drift in the PLL frequency.

The output from the amplifier 61, representing the time averaged differential sum of the first and second pulse outputs from the frequency detector, is fed to first and second comparators 62*a*, 62*b* which compare the amplifier output with respective positive and negative reference voltages +V1 and −V1. These reference voltages are set by the user to provide a desired tolerance for the net number of oscillator cycle slips above or below the signal frequency that can be permitted. The comparator outputs are fed via a first OR gate 63 to a second OR-gate 64, the other input of which is coupled to the data level detector. In the event that either a loss of signal indication is applied to one input of OR-gate 64 and/or a frequency error signal is applied to the other input of that OR-gate, an error signal indicative of loss of lock is output from the OR-gate 64.

By integrating the positive and negative going pulses with the respective leaky integrators, an output is produced that is proportional to the frequency of the slip pulses which may be used to control the operation of the PLL. With noisy data the frequency detector will produce random 'up' and 'down' pulses which could cause false triggering with a conventional single ended setup. In the present arrangement however, the mean density of both the 'up' and the 'down' pulses from the frequency detector is substantially the same when averaged over time and by the use of a differential integrator the effects of noise can be masked out with appropriate choice of integrator period. Thus, if over a given time period there are substantially equal numbers of cycle slips above and below the signal frequency, and the number of successive cycle slips in one direction does not exceed the limit set by the respective reference voltage, the phase locked loop will be treated as in lock with the signal and the loss of lock alarm will not be generated.

As discussed above, the choice of the pre-set voltages V1 and −V1 used as references for the two comparators determines the frequency difference between data and VCO which trips the loss of lock indication ad re-enables the frequency detector to drive the PLL loop. To prevent any risk of instability in the control system, it is preferred that the comparators should have hysteresis. For some electro-optic applications a robust indication before the error rate exceeds 1000 ppm is appropriate and with this implementation the risk of false triggering is sufficiently low that the limits may be set nominally at 500 ppm allowing loose tolerance of circuit components values. In any case these limits should be inside the capture range of the PLL operating without the use of the frequency detector.

In normal operation, when the PLL is first switched on, the VCO is typically significantly out of lock with the incoming data. In a short interval the loss of lock indication is flagged and this signal enables the frequency detector output into the PLL loop. With the frequency detector driving the PLL, the VCO is driven towards the frequency lock with the incoming data. As the VCO frequency approaches within a few multiples of the loop bandwidth of the PLL the phase detector captures the PLL and lock is acquired. With the PLL in lock the charge on the integrator in the control block leaks away and loss of lock signal is cancelled. This has the effect of disabling the frequency detector output to the PLL loop. Random noise triggering of the frequency detector now will not perturb the PLL loop. If however there is a sustained stream of pulses in either the "up" or "down" direction then the loss of lock flag is reasserted and the acquisition process is re-started.

Advantageously, the circuit arrangement of FIGS. 4, 5 and 6 is provided in the form of an integrated circuit fabricated e.g. in CMOS or BICMOS technology. The methods for translating the circuit diagrams into integrated circuit form will be familiar to those skilled in the art.

It will be understood that the above description of a preferred embodiment is given by way of example only and that various modifications may be made by those skilled in the art without departing from the spirit and scope of the invention.

What is claimed is:

1. An optical receiver arrangement comprising; a phase locked loop incorporating an oscillator whereby the loop can be matched in frequency to a received signal frequency, a frequency detector arranged to generate first and second pulse signals when the instant loop frequency is respectively above or below said received signal frequency, and control means responsive to said frequency detector outputs for generating a loss of lock indication when a time averaged differential sum of the first and second pulse signals exceeds a predetermined value.

2. An optical receiver as claimed in claim 1, wherein said frequency detector generates one first or second pulse respectively for each frequency cycle slip above or below the signal frequency between the received signal and the phase locked loop.

3. An optical receiver as claimed in claim 2, and including first and second leaky integrator means for integrating said first and second pulse signals respectively, and comparator means for determining from the integrated values of first and second pulse signals a measure of the magnitude of frequency deviation of the received signal frequency from the loop frequency.

4. An optical receiver as claimed in claim 3, wherein said comparator means is provided with adjustable reference voltage means whereby a maximum permitted frequency difference between the signal frequency and the loop frequency may be pre-set.

5. An arrangement for determining loss of frequency lock between a receiver local oscillator and a received digital optical signal in an optical communications system, the arrangement comprising; a frequency detector arranged to generate first and second pulse signals when the instant loop frequency is respectively above or below said received signal frequency, and control means responsive to said frequency detector outputs for generating a loss of lock indication when a time averaged differential sum of the first and second pulse signals exceeds a predetermined value.

6. A network node for use in an optical transmission system in which traffic is transported in multiplexed digital form, the node incorporating optical receiver arrangement comprising; a phase locked loop incorporating an oscillator whereby the loop can be matched in frequency to a received signal frequency, a frequency detector arranged to generate first and second pulse signals when the instant loop frequency is respectively above or below said received signal frequency, control means responsive to said frequency detector outputs for generating a loss of lock indication when a time averaged differential sum of the first and second pulse signals exceeds a predetermined value, and for enabling a local timing means for providing a timing reference to the node.

7. A network node as claimed in claim 6, wherein said frequency detector generates one first or second pulse respectively for each frequency cycle slip above or below the signal frequency between the received signal and the phase locked loop.

8. A network node as claimed in claim 7, wherein said receiver includes first and second leaky integrator means for integrating said first and second pulse signals respectively, and comparator means for determining from the integrated values of first and second pulse signals a measure of the magnitude of frequency deviation of the received signal frequency from the loop frequency.

9. A network node as claimed in claim 8, wherein said comparator means is provided with adjustable reference voltage means whereby a maximum permitted frequency difference between the signal frequency and the loop frequency may be pre-set.

10. A network node as claimed in claim 9, and comprising a synchronous node.

11. A method of detecting loss of lock between a received signal frequency and a local oscillator frequency in an optical receiver arrangement having a phase locked loop incorporating an oscillator whereby the loop can be matched in frequency to a received signal frequency, the method comprising; generating first and second pulse signals when the instant loop frequency is respectively above or below said received signal frequency, determining a time averaged differential sum of the first and second pulse signals, and generating a loss of lock indication when said time averaged difference measure exceeds a predetermined value.

12. A method claimed in claim 11, wherein said frequency detector generates one first or second pulse respectively for each frequency cycle slip above or below the signal frequency between the received signal and the phase locked loop.

13. A method as claimed in claim 12, wherein first and second pulses are integrated by respective first and second leaky integrators, and wherein a measure of the magnitude of frequency deviation from the received signal frequency is determined from the integrated values of said pulses.

14. A circuit arrangement for extracting clock information from a received digital signal and for detecting loss of frequency lock with that signal, the circuit comprising a phase locked loop incorporating an oscillator whereby the loop can be matched in frequency to a received signal frequency, a frequency detector arranged to generate first and second pulse signals when the instant loop frequency is respectively above or below said received signal frequency, and control means responsive to said frequency detector outputs for generating a loss of lock indication when a time averaged differential sum of the first and second pulse signals exceeds a predetermined value.

15. A circuit arrangement as claimed in claim 14, wherein said frequency detector generates one first or second pulse respectively for each frequency cycle slip above or below the signal frequency between the received signal and the phase locked loop.

16. A circuit arrangement as claimed in claim 15, and including first and second leaky integrator means for integrating said first and second pulse signals respectively, and comparator means for determining from the integrated values of first and second pulse signals a measure of the magnitude of frequency deviation of the received signal frequency from the loop frequency.

17. A circuit arrangement as claimed in claim 16, wherein said comparator means is provided with adjustable reference voltage means whereby a maximum permitted frequency difference between the signal frequency and the loop frequency may be pre-set.

18. A circuit arrangement as claimed in claim 14 and comprising an integrated circuit.

* * * * *